May 31, 1932. C. A. SCHACHT 1,861,095

SLIDING CASTER CUP

Filed June 9, 1931

Inventor
Clifford A. Schacht
By Alexander Powell
Attorneys

Patented May 31, 1932

1,861,095

UNITED STATES PATENT OFFICE

CLIFFORD A. SCHACHT, OF HUNTINGTON, INDIANA

SLIDING CASTER CUP

Application filed June 9, 1931. Serial No. 543,191.

This invention is a novel improvement in sliding caster cups and the principal object of the invention is to provide a caster cup adapted to be used on furniture of all kinds such as beds, desks, etc., whether provided with casters in the legs of the furniture, or without casters, my novel caster cup receiving either the caster or the end of the furniture leg itself seated in the recess therein.

Caster cups have heretofore been made of glass, but have not proven very satisfactory since the glass will break after a short use. Caster cups have heretofore also been made of wood but have been found unsatisfactory since the wood will not readily slide on the floor; also caster cups have been made of rubber, but such cups are also unsatisfactory since the rubber, like the wood, will not slide readily and moreover produces undue friction against movement upon the floor surface.

With the glass and wooden types of caster cups above mentioned, when the cups are set under the article of furniture and the furniture moved, the caster wheel tends to roll out of the cup and when using plain rubber caster cups such cups usually warp entirely out of shape.

With my improved caster cup the recessed rubber insert is encased or locked in a shell composed of stiff material of a slidable nature, such as metal, glass, wood, bakelite, etc., whereby the rubber cannot warp out of shape and moreover the recesses in my rubber insert are provided with means for setting up friction for preventing the caster wheels from rolling out of the caster cups when the furniture is moved.

I will explain the invention with reference to the accompanying drawing which illustrates several practical embodiments thereof to enable others familiar with the art to adopt and use the same; and will summarize in the claims the novel features of construction, and novel combinations of parts, for which protection is desired.

Figure 1:
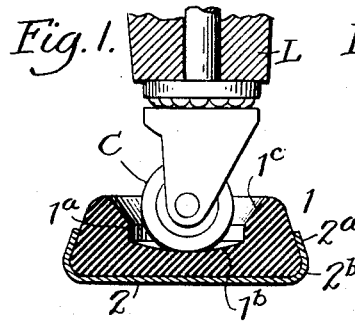
Fig. 1 is a vertical section through one form of caster cup showing a conventional caster wheel for a furniture leg inserted in the recess therein.
Figure 2:
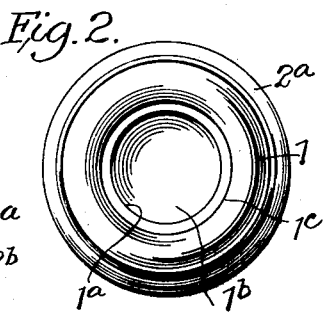
Fig. 2 is a top plan view of the caster shown in Fig. 1, detached.

As shown in Figs. 1 and 2, the caster cup comprises a resilient body 1 preferably of rubber or other yieldable material having a substantially cylindrical form, provided with a relatively deep recess 1a in its upper end the bottom of the recess being slightly concave as at 1b, and the upper portion of the recess 1a being flared outwardly, or countersunk, as at 1c, the recess above described forming a pocket 1 for receiving the caster wheel C and preventing same from rolling out of the cup. Around the lower portion of the body 1 is a shell 2, preferably of metal, glass, wood, bakelite, or other hard surfaced material which will readily slide upon the floor surface, the sides of the cup being crimped or bent slightly inwardly as at 2a to lock the rubber body 1 in the shell; and the corners of the shell being slightly rounded as at 2b so that the cup will slide easily upon the floor.

The caster cup may of course be made in various sizes to suit different sizes of caster wheels. Where the furniture leg L is not provided with a caster wheel the leg itself may be inserted in the recess 1a of the cup, and by reason of the shape of the recess the furniture leg L will not slide out of the cup when the latter is moved across the floor.

Figure 3:
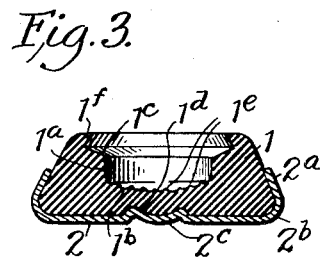
Fig. 3 is a vertical section through another form of caster cup.
Figure 4:
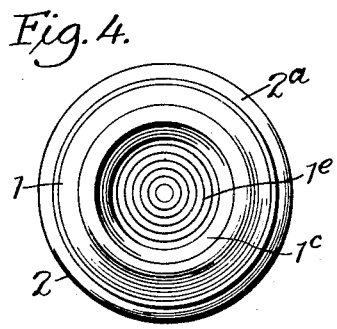
Fig. 4 is a top plan view of the caster cup shown in Fig. 3.

In Figs. 3 and 4 a slightly modified form of the caster cup is shown in which the shell 2 is provided with a raised parti-globular seat 2c at its center adapted to fit a complementary recess 1d in the rubber body 1. The raised portion 2c of the shell enhances the appearance of the cup and at the same time when the operator is assembling the shell 2 and body 1 the portions 2c and 1d fit snugly together, so that the rubber body 1 cannot slip in the shell 2 while being assembled. The raised seat 2c further assists in supporting the caster wheel or furniture leg L. The bottom of the recess 1b is moreover provided with a plurality of concentric raised corrugations 1e of circular form to assist in preventing the caster wheel C from rolling out of the cup when moved across the floor due to the friction set up by the corrugations 1e on the wheel C. The upper rim of the recess 1a is further provided with an inwardly extending bead 1f to further prevent the caster wheel or furniture leg from rolling or sliding out of the cup.

Figure 5:
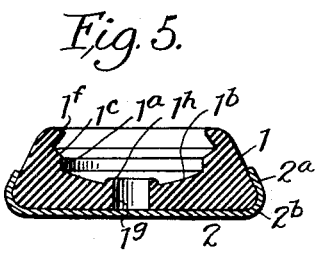
Fig. 5 is a vertical section through a modified form of caster cup.
Figure 6:
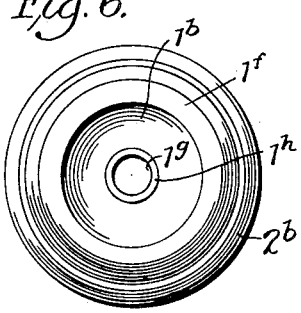
Fig. 6 is a top plan view of the caster cup shown in Fig. 5.

Figs. 5 and 6 show a further modification in which the rubber body 1 is substantially the same as that shown in Fig. 3, except that the concentric corrugations (1e of Fig. 3) are omitted; also the shell 2 is not provided with the raised seat (2c of Fig. 3); and a reduced recess 1g extends entirely through the body 1 from the bottom of the recess 1a to the shell 2, the upper edge of the reduced recess 1g gripping the caster wheel C and assisting in preventing same from rolling out of the cup. If desired the recess 1g may have a small bead 1h around its upper edge to increase the friction on the wheel C.

Figure 7:
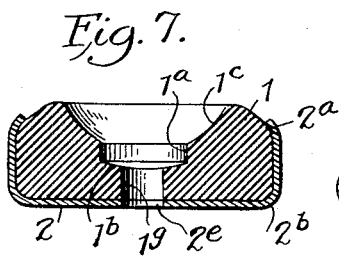
Figs. 7, 8, 9, 10, 11 and 12 are vertical sections through still further modified forms of caster cups.

In Fig. 7 the body 1 is substantially the same as that shown in Fig. 1, but is provided with the reduced bore 1g as shown in Fig. 5. and the shell 2 is also provided with a central opening 2e below the reduced bore 1g of the body. This caster cup is particularly adapted for use on oil stoves and the like, for if any oil, water, etc. should fall into the recess in the cup the same will readily drain therefrom and cannot collect or remain therein.

Figure 13:
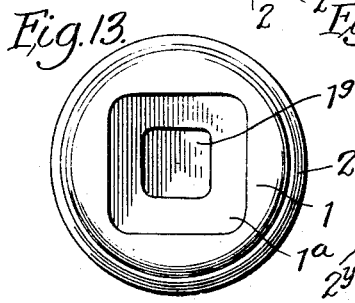
Fig. 13 is a plan view of a caster cup having a non-circular recess therein.

The recesses 1a and 1g, may if desired be of any desired shape and need not be circular, for instance, as shown in Fig. 13 they may be square, or they may be rectangular or otherwise, the shape of the recess being such as will suit the shape of the furniture leg which would usually be square for wooden furniture; and round for metallic furniture.

Figure 8:
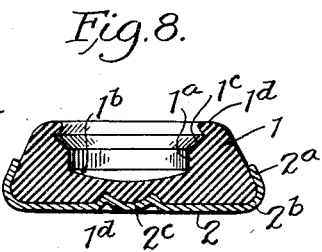

In Fig. 8 the rubber body 1 is shown as being very thin below the recess 1a and is otherwise substantially the same as that shown in Fig. 3 except that the corrugations 1e are omitted. When the caster wheel C is set in the caster cup, the thin rubber in the base of the cup gives, creating a deeper pocket which keeps the wheel from rolling out, and the raised seat 2c enhances the appearance of the shell and at the same time when the operator is assembling the body 1 and shell 2 the parts will fit snugly together so that the rubber body 1 cannot slip, and the raised seat 2c also helps support the weight of the caster wheel.

Figure 9:
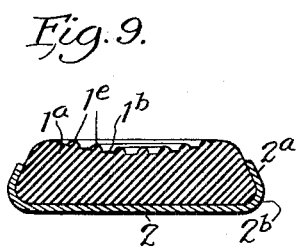

Fig. 9 shows a caster cup for very light furniture provided either with or without caster wheels. In this type of cup the recess 1a need only be very shallow, the concentric raised corrugations 1e are also provided as in Fig. 3, and the corrugations 1e will keep the wheel or furniture leg from rolling off or out of the cup.

Figure 10:
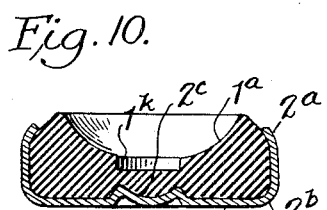
Figure 11:
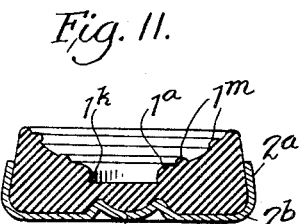
Figure 12:
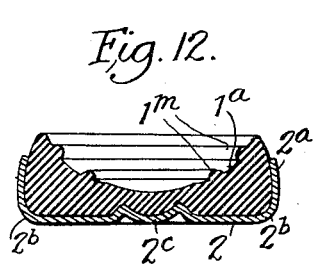

In Fig. 10 the caster cup is substantially the same as shown in a preceding figure, but the reduced recess 1k does not extend to the shell 2, but forms a deepened pocket for frictionally engaging the caster wheel C or furniture leg L. The shell is preferably provided with the raised seat 2c; and in Fig. 11 the caster cup is substantially the same as in Fig. 10 with additional beads 1m in the upper recess 1a; and in Fig. 12 substantially the same cup as shown in Fig. 11 is illustrated, except that the reduced recess 1k is omitted, the recess 1a being slightly deeper than in Figs. 10 and 11.

Figure 14:
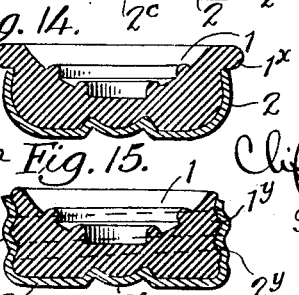
Figs. 14 and 15 are sections through further modified forms of caster cups.

Fig. 14 shows a further modified form of caster cup; the body 1 being substantially the same as that shown in the previous figures (particularly Fig. 11) and fitting the shell 2 which may have uncrimped or vertical sides, the rubber body being retained in the shell 2 by vacuum. A relatively thick exterior bead 1x extends around the top of the body 1 above the shell 2 and projects outwardly beyond the shell to act as a bumper to prevent the hard shell 2 from marring or injuring walls, or other furniture against which the shell might otherwise contact when the caster cup is moved. The recess in the body 1 may be plain or provided with pockets, or corrugations as shown in the other figures.

Figure 15:
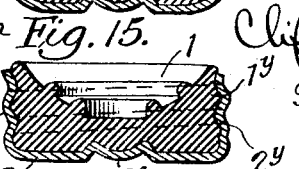

In Fig. 15 the rubber body 1 is shown as screwed into the shell 2, both parts having threads formed therein. In this modification no crimping or bending of the shell around the rubber is required.

My novel sliding caster cups can be used on desks, beds and all kinds of furniture, whether or not the furniture is provided with caster wheels, and the recesses in the upper ends of the cups can be made of any desired shape, either circular, square, etc., to suit the shapes of the legs. If caster wheels are not used on the legs then the legs themselves may be fitted in the cups; and if the legs are provided with caster wheels the caster wheels may be placed in the cups. The hard shells 2 permit the caster cups to be readily moved across the floor, and the shells moreover lock the rubber bodies 1 in place therein. The double pocketed or recessed construction with the corrugations in the recesses will prevent the caster wheels from rolling out of the cups while the furniture is being moved.

I do not limit my invention to the exact forms shown in the drawings, for obviously changes may be made therein within the scope of the claims.

I claim:

1. A yieldable insert for sliding caster cups comprising a relatively flat rubber body having a relatively shallow recess in its upper portion for loosely receiving a furniture leg and means in the recess for frictionally preventing the leg from sliding out of said recess.

2. A sliding caster cup, comprising a recessed body of yielding material; a shell of hard material around the lower portion of the body; and raised corrugations in said recess for preventing articles from rolling out of said recess.

3. A sliding caster cup, comprising a recessed body of yielding material; a shell of hard material around the lower portion of the body; and an inwardly projecting bead at the upper end of the recess for preventing articles from rolling out of the recess.

4. A sliding caster cup, comprising a recessed body of yielding material; a shell of hard material around the lower portion of the body; raised corrugations in the recess, and an inwardly projecting bead at the upper end of the recess, for preventing articles from rolling out of the recess.

5. A sliding caster cup, comprising a recessed body of yielding material; a shell of hard material around the lower portion of the body; and a reduced depression in the bottom of the recess for preventing articles from rolling out of the recess.

6. A sliding caster cup, comprising a recessed body of yielding material; a shell of hard material around the lower portion of the body; and interengaging portions on the bottom of the body and shell, for the purpose specified.

7. A sliding caster cup, comprising a recessed body of resilient rubber; a shell of hard slidable material around the lower portion of the body; a reduced depression in the bottom of the recess; and an inwardly projecting bead at the upper end of the recess for preventing articles from rolling out of said recess.

8. A sliding caster cup, comprising a recessed body of resilient rubber; a shell of hard slidable material around the lower portion of the body; a reduced depression in the recess, and raised corrugations in the bottom of the depression for preventing articles from rolling out of said recess.

9. A sliding caster cup, comprising a recessed body of resilient rubber; a shell of hard slidable material around the lower portion of the body; a reduced depression in the bottom of the recess, and concentric raised corrugations on the walls of the recess for preventing articles from rolling out of said recess.

10. A sliding caster cup, comprising a recessed body of resilient rubber; a shell of hard slidable material around the lower portion of the body; a reduced depression in the bottom of the recess for preventing articles from rolling out of said recess; and interengaging portions on the bottom of the shell, for the purpose specified.

11. A sliding caster cup, comprising a recessed body of resilient rubber; a shell of hard slidable material around the lower portion of the body; a reduced depression in the bottom of the recess; raised corrugations in the bottom of the depression, and an inwardly projecting bead at the upper end of the recess for preventing articles from rolling out of said recess.

CLIFFORD A. SCHACHT.